Patented Oct. 24, 1950

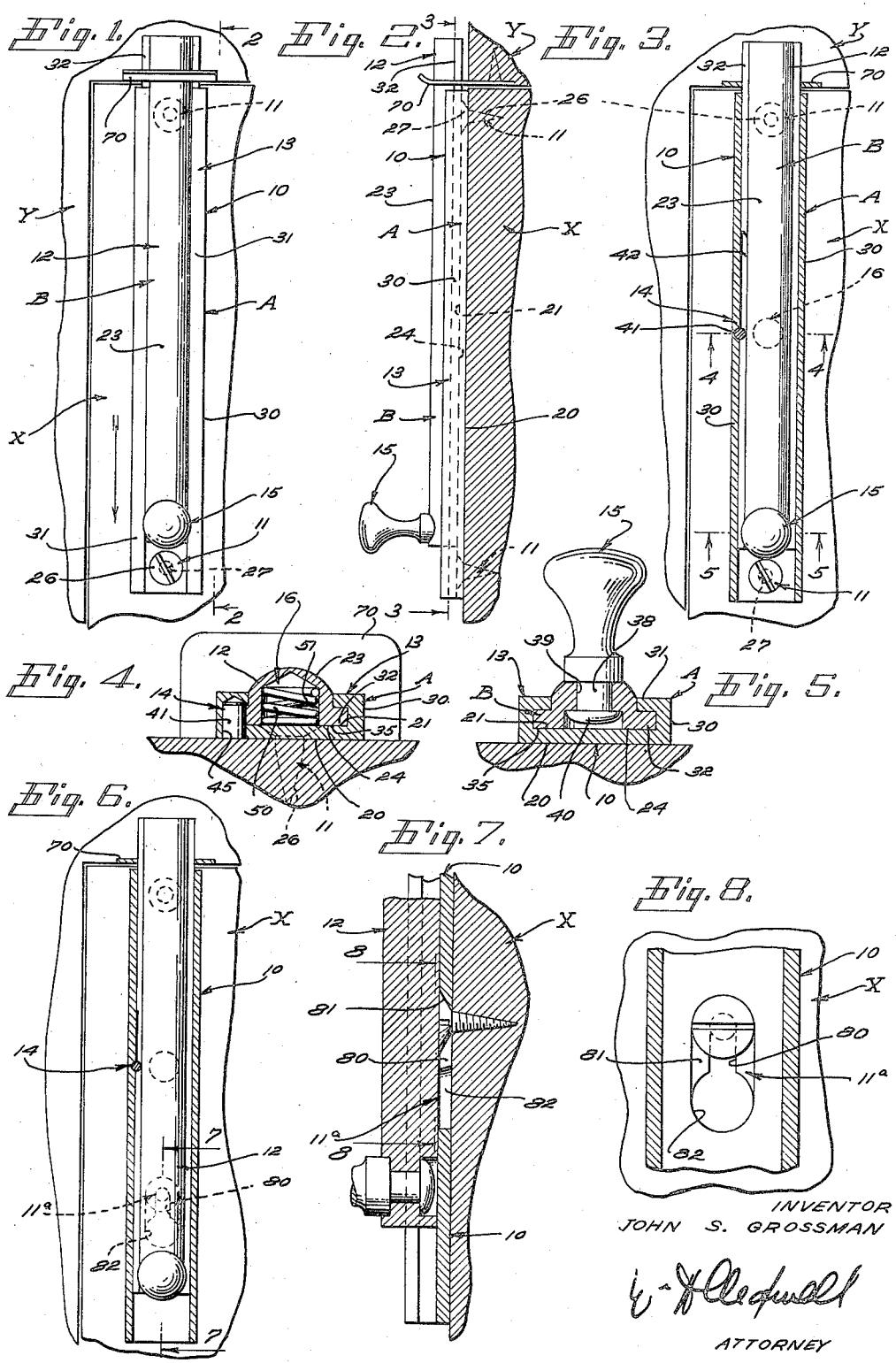

2,527,413

UNITED STATES PATENT OFFICE 2,527,413

BOLT TYPE FASTENER

John S. Grossman, Los Angeles, Calif.

Application July 17, 1948, Serial No. 39,230

2 Claims. (Cl. 292—147)

This invention is concerned with a bolt type fastener and relates more particularly to a structure of the type commonly known as a surface bolt. It is a general object of the present invention to provide a fastener of the type mentioned which is of simple, practical and improved construction.

The usual surface bolt type of fastener involves a bolt carried by mounting means, usually including one or more strap-like parts overlying the bolt and provided with projecting ears that receive screws or like fasteners.

It is a general object of my present invention to provide a fastener of the general character referred to characterized generally by two principal elements, one a plate and the other a bolt, which elements are slidably engaged through side flanges on the bolt engaged by edge flange with lips on the plate.

Another object of the present invention is to provide a fastener of the general character referred to wherein the principal elements are coextensive or of equal length so that a substantial portion of the plate is covered by the bolt when in the retracted position, and the screw fasteners that hold the plate are covered by the bolt when it is in the retracted position.

It is another object of the present invention to provide a fastener of the general character referred to including a simple, inexpensive, dependable stop means limiting movement of the bolt relative to the plate.

Another object of the invention is to provide a fastener of the general character referred to including a simple, inexpensive, dependable and durable drag means which at all times offers resistance to movement of the bolt relative to the plate.

A further object of the invention is to provide a fastener of the general character referred to wherein the principal elements, namely the plate and the bolt with the parts thereof by which these elements are slidably connected are both of such form or configuration as to be advantageously manufactured or formed by extrusion rather than by costly machining or casting operations.

It is a further object of the present invention to provide a fastener of the general character referred to wherein the plate has screw openings at its end portions, one of which is elongate and extends lengthwise of the plate to have hooked engagement with a screw, and in which the plate and bolt are limited in relative movement by stop means so that the elongate opening is permanently covered by the bolt while the opening at the other end of the plate may be uncovered for reception of a screw or the like.

The various objects and features of my invention will be fully understood from the following detailed description of typical preferred forms and applications of my invention, throughout which description reference is made to the accompanying drawings, in which:

Fig. 1 is a front elevation of a fastener embodying the present invention showing it applied to a closure and with the bolt retracted. Fig. 2 is a side elevation of the fastener shown in Fig. 1, being a view taken as indicated by line 2—2 on Fig. 1 and showing the bolt extended to engage a striker plate. Fig. 3 is a sectional view of the structure, being a view taken as indicated by line 3—3 on Fig. 2. Fig. 4 is an enlarged detailed transverse sectional view taken as indicated by line 4—4 on Fig. 3. Fig. 5 is an enlarged detailed transverse sectional view taken as indicated by line 5—5 on Fig. 3. Fig. 6 is a view similar to Fig. 1, showing a modified form of construction and illustrating the bolt extended and engaged with a striker plate. Fig. 7 is an enlarged detailed sectional view taken as indicated by line 7—7 on Fig. 6, and Fig. 8 is a sectional view taken as indicated by line 8—8 on Fig. 7.

My present invention is applicable, generally, to bolt type fasteners or to fasteners ordinarily known as surface bolts. The invention is particularly useful as applied to surface bolts such as are used in connection with doors, windows and other like elements and therefore I have, in the drawings, shown the invention in simple preferred forms and incorporated in a fastener useful, generally where a surface bolt is required.

Referring first to the form of the invention illustrated in Figs. 1 to 5, inclusive, the structure involves, generally, two principal elements, namely a plate element A and a bolt element B. More specifically the structure involves a plate 10, mounting means 11 for the plate, a bolt or rod 12, means 13 slidably connecting the plate and bolt, stop means 14 limiting relative movement between the bolt and plate, and a handle 15 and drag means 16 resisting movement between the bolt and plate.

The plate 10 is preferably a simple flat elongate part having a flat bottom 20 and a flat top 21. In practice I prefer to make the plate 10 as thin as possible consistent with the desired strength and with the structural features necessary for the means 11, as will be hereinafter described.

The bolt or rod 12 is a simple elongate part preferably coextensive with the plate 10 so that when it is retracted, as shown in Fig. 1, the ends of the bolt coincide with the ends of the plate. In its preferred form the bolt has a rounded or crowned top 23 and it has a flat bottom 24 to slidably engage the top 21 of the plate 10.

The mounting means 11 serves to mount the plate 10 on a suitable support or element such as a closure X and it is preferred that the mounting means include ordinary wood screws 26, or the like, engaged through openings 27 in the end portions of the plate. The openings 27 are preferably located midway between the side edges of the plate 10 and they are preferably counterbored from the top 21 of the plate so that the heads of the screws are flush with or below the top 21 of the plate when the screws are applied to secure the plate to the member X as shown throughout the drawings.

The means 13 slidably connecting the plate and bolt involves upstanding edge flanges 30 at the longitudinal edges of the plate 10, inwardly projecting lips 31 on the outer portions or edges of the flanges 30 and side flanges 32 on the side or edge portions of the bolt 12. The edge flanges 30 and lips 31 cooperate with the plate 10 to define inwardly faced or opposite guideways that slidably receive the side flanges 32 on the bolt 12. In accordance with my invention the edge flanges 30 are integrally joined with or are integral extensions of the plate 10 and the lips 31 are integrally joined to or are a part of the flanges 30. It is preferred that the flanges 30 and lips 31 extend throughout the length of the plate 10 with the result that the element A of the construction is uniform in cross-sectional configuration throughout its length, making it practical to form this element of the structure as an extrusion.

The flanges 32 on the bolt 12 have flat bottoms 35 in a plane coinciding with the bottom 24 of the bolt so that they slidably engage or bear upon the top 21 of the plate 10 as clearly shown in Figs. 4 and 5 of the drawings. The flanges 32 are preferably integral with or are integral extensions of the bolt 12 and extend continuously from one end of the bolt to the other, with the result that the bolt is uniform in cross sectional configuration throughout its length and is such that it can be advantageously formed as an extrusion.

The handle 15 may or may not be employed as circumstances require. In the case illustrated the handle is a knob-like projection applied to the bolt 12 to project from the top 23 thereof. The handle is formed with a shank 38 secured in an opening 39 formed in the bolt at a suitable point between its ends. The shank 38 may be fixed in the opening 39 in any suitable manner. In the drawings it is shown pinned or headed over at 40.

The stop means 14 provided by the present invention involves a lug or projection 41 extending from the plate 10 into one of the guideways of the plate to enter a recess or notch 42 in the bolt element B. In practice the desired recess or notch is provided in the bolt element by cutting away or recessing one of the side flanges 32 of the bolt element. In practice one of the side flanges 32 may be recessed or cut away partially or wholly throughout a suitable portion of its length, the length of such notch or recess serving to determine the length of travel obtained between the bolt and the plate. In practice the bolt element is initially formed with both flanges extending uniformly from one end to the other of the bolt. One of the flanges 32, that is, the one which occupies the guideway into which the projection 41 extends, is then cut away either wholly or partially enough to accommodate the projection and throughout enough of the length of the bolt to allow for the desired travel of the bolt relative to the plate. In the preferred form of the invention the projection 41 may be any suitable part extending into the guideway so that it is engaged by the ends of the notch 42 in the bolt element. In the case illustrated the stop lug 41 is a pin-like part held in a bore 45 established in the plate element from the bottom thereof, as clearly shown in Fig. 4 of the drawings. In practice the bore 45 is made such as to tightly receive the pin 41 so that the pin does not become displaced in the course of handling the structure prior to its being installed as shown throughout the drawings.

The drag means 16 is provided to establish frictional engagement between the elements A and B preventing accidental movement of the bolt relative to the plate. In the preferred form of the invention the drag means involves a resilient element engaged between the bolt 12 and the plate 10. In the structure illustrated the resilient element is in the form of a helical compression spring 50 carried in a bore 51 formed in the bolt 12 from its bottom side 24. The spring 50 is so proportioned as to be under compression when in place, as shown in Fig. 4, so that it bears on the top 21 of the plate 10. It will be apparent that by partially proportioning the spring 50 the desired pressure is established between the elements A and B so that there is friction between these parts resisting movement of the bolt relative to the plate.

In installing the structure shown in Figs. 1 to 5 the screw 26 at one end of the plate is applied when the bolt is positioned to uncover the screw hole at that end of the plate. The other screw is then applied when the bolt is positioned to uncover the screw hole at the other end of the plate. The stop means 14 is so proportioned as to allow the bolt to be moved relative to the plate to alternately uncover the screw holes so that the screws can be applied securing the plate to the member X. In practice a striker plate 70 may be employed in connection with the fastener that I have provided. In the drawings I have shown a typical striker plate applied to a frame or like element Y with which the element X is combined. From an examination of Fig. 1 of the drawings it will be apparent that when the bolt 12 is retracted or withdrawn from the striker plate 70 it may be positioned with its ends coincidental with the ends of the plate 10 so that both screws 26 are covered, leaving the structure in a most sightly condition, that is, without exposed parts such as screws or the like.

In the form of the invention shown in Figs. 6, 7 and 8 of the drawings the mounting means 11ª includes a simple bore or round screw hole at one end portion of the plate 10, preferably the end portion from which the bolt 12 is to be extended to engage a striker plate 70, or the like, while the other hole in the plate 10 instead of being a round hole or bore is an elongate opening and extends lengthwise of the plate. The elongate opening 80, as shown in the drawings, is counterbored or beveled as shown at 81 to accommodate a screw head and at one end 82 it is enlarged to pass a screw head. With this construction a screw such as an ordinary wood screw to be used in mounting the plate at the end provided with the elongate opening is initially applied to the member X with the head thereof projecting a suitable distance from the surface of part X. The plate 10 is then applied over the head of the screw so that the screw head passes through opening 82. The plate is then moved lengthwise so that the shank of the screw enters the elongate opening 80, causing the bevel or countersunk portion of the opening to receive the head of the screw. With the plate thus engaged with or hooked over one screw the other screw employed in mounting the plate is applied to the round hole or bore at the other end portion of the plate. It will be apparent that the two screws thus applied to the plate mount it effectively on the member X.

When the mounting means 10a that I have just described is employed it is preferred to relate the stop means 14 thereto so that the elongate opening by which the plate 10 is hooked to a screw is permanently covered by the bolt 12. It will be apparent from the drawings how the elements can be proportioned or related so that with the last described form of mounting means the bolt may be moved between an extended position where it engages a striker plate 70 as shown in Fig. 6, and a retracted position where it is disengaged from the striker plate without exposing either of the mounting screws that hold the plate to the support X. To uncover the screw that is engaged in the round hold or bore the bolt must be retracted considerably further than is necessary to merely disengage it from the striker plate.

From the foregoing description it will be apparent that I have, by my present invention, provided a structure which makes it possible for me to form the principal elements as simple extrusions. Further, my construction is such that the drag means is incorporated in the structure at very little expense and is at the same time effective and durable. In like manner the stop means is of simple dependable form. It is most significant that through the construction of the present invention a fastener is provided which is simple, practical and dependable, easily mounted, and which lends itself to being formed so that it is most sightly. The structure of the present invention is free of straps surrounding the bolt and of projecting lugs or ears to accommodate screws.

Having described only typical preferred forms and applications of my invention, I do not wish to be limited or restricted to the specific details herein set forth, but wish to reserve to myself any variations or modifications that may appear to those skilled in the art and fall within the scope of the following claims:

Having described my invention, I claim:

1. A fastener of the character described including, an elongate base plate, parts projecting from opposite edges of the plate defining opposed guideways, a bolt, and side flanges on the bolt slidably engaged in the guideways, stop means limiting movement of the bolt relative to the plate, said parts including upstanding edge flanges at the edges of the plate and inwardly projecting lips on the edge flanges overlying the side flanges, there being openings through the plate for mounting members, one opening being elongate and extending lengthwise of the plate and another opening being a bore extending through the plate, the bolt being stopped to permanently cover the elongate opening and being movable into and out of position covering the bore.

2. A fastener of the character described including, a base plate with a flat top, parts projecting from opposite edges of the plate defining opposed guideways, a bolt with a flat bottom bearing on the top of the plate, flanges on the bolt slidably engaged in the guideways, drag means resisting movement of the bolt relative to the plate, and stop means limiting movement of the bolt relative to the plate, the plate having holes in its end portions to receive fastening means, there being a socket in the bottom of the bolt, the drag means including a helical spring in the socket frictionally engaging the top of the plate.

JOHN S. GROSSMAN.

REFERENCES CITED

The following references are of record in the file of this patent:

UNITED STATES PATENTS

| Number | Name | Date |
| --- | --- | --- |
| 67,549 | Hunter | Aug. 6, 1867 |
| 1,244,064 | Mattice | Oct. 23, 1917 |
| 1,621,934 | Kintner | Mar. 22, 1927 |
| 1,653,015 | Koelln | Dec. 20, 1927 |
| 1,916,509 | Hammer | July 4, 1933 |

FOREIGN PATENTS

| Number | Country | Date |
| --- | --- | --- |
| 7,847 | Great Britain | Apr. 20, 1894 |
| 428,494 | Great Britain | May 14, 1935 |